United States Patent [19]

Blizzard

[11] 4,423,095

[45] Dec. 27, 1983

[54] SILICONE-ORGANIC COATING COMPOSITIONS

[75] Inventor: John D. Blizzard, Bay City, Mich.

[73] Assignee: Dow Corning Corporation, Midland, Mich.

[21] Appl. No.: 461,814

[22] Filed: Jan. 28, 1983

[51] Int. Cl.$^3$ .............................................. A23F 3/00
[52] U.S. Cl. ................................ 427/387; 427/372.2; 427/374.1; 524/588; 525/56; 525/58; 525/60; 525/100; 525/104; 525/105
[58] Field of Search ................ 525/56, 58, 60, 100, 525/104, 105; 524/588; 427/372.2, 374.1, 387

[56] References Cited

U.S. PATENT DOCUMENTS 4,310,678  1/1983  Blizzard et al. .
4,322,518  3/1983  Blizzard .

Primary Examiner—Melvyn I. Marquis
Attorney, Agent, or Firm—George A. Grindahl

[57] ABSTRACT

Homogeneous compositions comprising certain liquid silicone resins, certain silicon-free, film-forming organic polymers and a compatibilizing liquid and a method for preparing preferred homogeneous compositions wherein the compatibilizing liquid is water are disclosed. The homogeneous compositions are useful for coating a substrate to provide a water-resistant coating on the substrate which can function, for example, as a protective coating or as an adhesive-release coating and; accordingly, a method for coating a substrate, such as paper, is also disclosed.

20 Claims, No Drawings

SILICONE-ORGANIC COATING COMPOSITIONS

BACKGROUND OF THE INVENTION

The present invention relates to coating compositions which provide films, such as adhesive release films and protective films, having improved water resistance, to a method for coating a substrate therewith and to a method for preparing stable emulsion forms thereof.

More particularly the present invention relates to coating compositions comprising a silicon-free, film-forming organic polymer and a liquid silicone resin which provide a film having the strength of the organic polymer and the water resistance of the silicone resin.

The liquid silicone resin which is used in the compositions and methods of this invention has been disclosed by J. D. Blizzard and T. J. Swihart in U.S. Pat. No. 4,310,678.

The liquid silicone resin component has further been mixed with certain vinyl- and/or hydroxyl-containing polydiorganosiloxane fluids to provide curable silicone compositions, as disclosed by J. D. Blizzard in U.S. Pat. No. 4,322,518. The curable silicone compositions of Blizzard are useful for coating a substrate. For example, a paper substrate is coated to provide a selectable-force adhesive release coating thereon.

While the compositions of Blizzard are useful for providing a selectable-force adhesive release coating, said force is in the premium to moderate force range, i.e., in the range of 20 to 50 N/m. Although a premium to moderate release force is highly desirable, higher release forces are also desired.

The compositions of Blizzard have the disadvantage that they are relatively expensive, compared to organic polymer-based coating compositions.

Film-forming organic polymers, such as poly(vinyl alcohol) and poly(styrene-co-butadiene), are relatively inexpensive compared to silicone polymers; however, they often lack the water resistance of silicone films.

BRIEF SUMMARY OF THE INVENTION

It is an object of the present invention to provide coating compositions which provide a coating on a substrate that possesses the water resistance of a silicone coating and the strength of an organic coating. It is a further object of this invention to provide silicone-containing coating compositions which are less expensive than all-silicone coating compositions. It is another object of this invention to provide coating compositions which provide an adhesive release coating having intermediate-force release. It is also an object of this invention to provide a method for preparing water-based, silicone resin-containing coating compositions. It is yet another object of the present invention to provide a method for coating a substrate.

Briefly stated, these objects, and others which will be obvious upon consideration of the following disclosure and appended claims, are obtained by mixing the liquid silicone resins disclosed by Blizzard and Swihart in U.S. Pat. No., 4,310,678, with a silicon-free film-forming organic polymer, in the presence of compatibilizing liquid to provide a homogeneous composition and, thereafter, coating a substrate therewith and evaporating the compatibilizing liquid. In a highly preferred embodiment of this invention the compatibilizing liquid is water and the resulting homogeneous composition is an aqueous emulsion. The coating compositions of this invention can further contain a curing catalyst, if desired.

DETAILED DESCRIPTION OF THE INVENTION

The present invention comprises three aspects. In a first aspect this invention relates to compositions. In a second aspect this invention relates to a method for preparing compositions of this invention in aqueous emulsion form. In a third aspect this invention relates to a method for coating a substrate, using the compositions of this invention.

In said first aspect the present invention relates to a composition consisting essentially of a homogeneous mixture of (I) a liquid silicone resin prepared by (A) forming a homogeneous mixture having an acid number greater than zero and consisting essentially of (a) an organic solvent solution of a resinous copolymeric siloxane consisting silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating the homogeneous mixture of (A) to remove substantially all of said organic solvent therefrom, (II) one or more silicon-free, film-forming organic polymers and (III) a compatibilizing liquid in at least a sufficient amount to render the composition homogeneous; the weight ratio of the amount of component (I) to the amount of component (II) having a value of from 1/99 to 99/1.

Component (I) of the compositions of this invention is designated herein as a liquid silicone resin and is disclosed in U.S. Pat. No. 4,310,678, the disclosure of which is hereby incorporated herein by reference to teach its preparation. It is prepared by reacting a first reactant (a), designated herein as a resinous copolymeric siloxane, with a second reactant (b), designanted herein as a liquid organohydrogenpolysiloxane.

Component (a) that is used to prepared the liquid silicone resin (I) is an organic solvent solution of a resinous copolymeric siloxane which consists essentially of $R_3SiO_{1/2}$ siloxane units and $SiO_{4/2}$ siloxane units. The resinous copolymeric siloxane has a complex, as-yet-undetermined structure; however, for the purposes of this disclosure it is fully characterized by the ratio of said siloxane units therein, by its silanol, i.e. silicon-bonded hydroxyl, content and by its solubility in organic solvents, such as benzene.

The resinous copolymeric siloxane portion of component (a) consists of from 0.6 to 0.9 $R_3SiO_{1/2}$ units for every $SiO_{4/2}$ unit. Each R denotes a monovalent hydrocarbon radical; such as an alkyl radical, such as methyl, ethyl, isopropyl, butyl and hexyl; an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl, cyclohexyl and cyclohexenyl. Preferably all R radicals in component (a) are lower alkyl radicals although a minor portion of them can be replaced with other monovalent hydrocarbon radicals, such as the vinyl radical and/or the phenyl radical, to provide additional properties for the resinous copolymer, such as the reactivity attendant therewith. The resinous copolymeric siloxane portion further comprises from 0.1 to 5 percent by weight of silicon-bonded hydroxyl radicals and frequently comprises trace amounts of silicon-bonded alkoxy radicals such as methoxy, ethoxy or isopropoxy radicals which arise from the particular method that is used to prepare said resinous copolymeric siloxane.

In a preferred component (I) of the composition of this invention the resinous copolymeric siloxane portion of component (a) consists essentially of $(CH_3)_3SiO_{1/2}$ siloxane units and $SiO_{4/2}$ siloxane units, in the number ratio stated above, and has a silicon-bonded hydroxyl content of from 1 to 5 percent by weight.

Resinous copolymeric siloxanes consisting of $R_3SiO_{1/2}$ units and $SiO_{4/2}$ units are well known in the art and are described by Daudt et al., U.S. Pat. No. 2,676,182, and by Goodwin, U.S. Pat. No. 2,857,356, the disclosures of which are hereby incorporated herein by reference to teach how to prepare resinous copolymeric siloxanes which are suitable for preparing component (I) of the compositions of this invention. Briefly, an aqueous solution of sodium silicate (e.g. No. 9 sodium silicate sold by DuPont) is acidified to the proper pH by adding it to a mixture of hydrochloric acid and isopropanol and the resulting acidic silica hydrosol is then treated with a source of $R_3SiO_{1/2}$ siloxane units such as $R_3SiOCH_3$, $R_3SiCl$ or $R_3SiOSiR_3$ dissolved in a mixture of isopropanol and xylene. After being heated the reaction mixture is cooled and is separated into an aqueous phase, which is discarded, and a non-aqueous phase comprising the resinous copolymeric siloxane, which is further washed with water to reduce its acid number and to remove water-soluble components, such as isopropyl alcohol. Preferably the acidic resinous copolymeric siloxanes which are prepared by these methods are washed with water to remove most, but not all, of the acid therein. For example, resinous copolymeric siloxanes which have been prepared by the method of Daudt et al. typically have sufficient acid remaining therein to provide an acid number of from 0.2 to 2.0, as measured by the method hereinafter disclosed, based on the amount of solvent-free resinous copolymeric siloxane. These materials are preferred for the purposes of this invention.

Resinous copolymeric siloxanes are typically prepared in an organic solvent which can conveniently serve as the organic solvent portion of component (a). Alternatively, the resinous copolymeric siloxane can be prepared in one organic solvent and subsequently can be transferred to a second organic solvent, if desired, to form component (a). If the resinous copolymeric siloxane does not contain any organic solvent, one or more organic solvents should be mixed therewith before or during the preparation of the homogeneous mixture of (a) and (b).

The particular organic solvent portion of component (a) is not critical and can be, for example, an aliphatic hydrocarbon, an aromatic hydrocarbon or halogenated derivatives of either or mixtures thereof. Preferably the organic solvent is one that forms an azeotrope with water so that any water that is formed during the subsequent heating step, detailed below, can be conveniently removed by azeotropic distillation. Particularly useful organic solvents include benzene, toluene, xylene, trichloroethylene and mineral spirits.

The amount of resinous copolymeric siloxane contained in component (a) is not critical and can range from 10 to 90 percent by weight. It is preferred that only as much organic solvent as is needed to prepare a homogeneous mixture of resinous copolymeric siloxane and liquid organohydrogenpolysiloxane be used in order to minimize the amount of time and/or energy needed to subsequently remove it from the mixture as described hereinafter. A preferred component (a) contains approximately 60 to 70 percent by weight resinous copolymeric siloxane and the balance solvent.

Component (b) that is used to prepare the liquid silicone resin component (I) is any liquid organohydrogenpolysiloxane containing an average of at least one silicon-bonded hydrogen radical per molecule, and can have a linear, cyclic or branched structure or combinations thereof. Thus, component (b) has the unit formula $R'_m H_n SiO_{(4-m-n)/2}$ wherein m and n denote positive numbers whose sum is less than 4, preferably from 1.9 to 2.1. The organic radicals (R') in component (b) can be any of the R radicals denoted above. Preferably, although not necessarily, the organic radicals (R') in component (b) are the same as the organic radicals (R) in component (a).

Examples of organohydrogenpolysiloxanes that are suitable for use as component (b) include cyclic organohydrogenpolysiloxanes of the unit formula $R'_m H_{2-m}SiO$, such as $\{(CH_3)(H)SiO\}_x$ wherein x is 3, 4, 5, 6 and higher and $\{(CH_3)(H)SiO\}_y\{(CH_3)_2SiO\}_z$ wherein the sum of y plus z is 3, 4, 5, 6 and higher; and linear organohydrogenpolysiloxanes of the formula $R''R'_2SiO(R'_2SiO)_a(R'HSiO)_b SiR'_2R''$, such as $R''(CH_3)_2SiO\{(CH_3)_2SiO\}_a\{(CH_3)(H)SiO\}_b Si(CH_3)_2R''$ wherein R'' denotes H or methyl and a and b each denote zero or a number greater than zero, provided there is at least one silicon-bonded hydrogen radical per molecule. Examples of linear organohydrogenpolysiloxanes having the above formula include $H(CH_3)_2SiO\{(CH_3)_2SiO\}_a Si(CH_3)_2H$, $(CH_3)_3SiO\{(CH_3)(H)SiO\}_b Si(CH_3)_3$, $(CH_3)_3SiO\{(CH_3)(H)SiO\}_b\{(CH_3)_2SiO\}_a Si(CH_3)_3$ and $H(CH_3)_2SiO\{(CH_3)_2SiO\}_a\{(CH_3)(H)SiO\}_b Si(CH_3)_2H$.

An organohydrogenpolysiloxane having the formula $(CH_3)_3SiO\{(CH_3)(H)SiO\}_b Si(CH_3)_3$ wherein b has an average value of from 30 to 70 is a highly preferred component (b) for the purposes of this invention, particularly when it is desired that the liquid silicone resin prepared therefrom contain relatively large amounts of silicon-bonded hydrogen radicals.

Liquid organohydrogenpolysiloxane (b) can have any viscosity; however, it preferably has a viscosity of less than 1 pascal-second at 25° C. when used in amounts of less than 60 parts by weight for every 40 parts by weight of resinous copolymeric siloxane.

Organohydrogenpolysiloxanes and their preparation are well known in the organosilicon polymer art; some are commercially available. Briefly the preparation of organohydrogenpolysiloxanes can be accomplished, for example, by hydrolyzing a suitable mixture of hydrolyzable silanes, such as chlorosilanes, and equilibrating the resulting hydrolyzate under acid catalysis. Alternatively, a mixture of suitable siloxanes, such as cyclic siloxanes and linear siloxanes, can be copolymerized and equilibrated under acid catalysis.

In the preparation of component (I) the amounts of resinous copolymeric siloxane and liquid organohydrogenpolysiloxane that are mixed may vary widely. Generally, the viscosity of the liquid silicone resin that is produced varies directly with the viscosity of the organohydrogenpolysiloxane and inversely with its relative amount in the homogeneous mixture of components (a) and (b). Liquid silicone resins can be obtained when as little as about 10 percent by weight of organohydrogenpolysiloxane is used, based on the weight of resinous copolymeric siloxane plus organohydrogenpolysiloxane.

For the purposes of this invention a highly preferred liquid silicone resin component is obtained when the homogeneous mixture that is heated comprises from 40 to 60 parts by weight of resinous copolymeric siloxane consisting of $(CH_3)_3SiO_{1/2}$ units and $SiO_{4/2}$ units and containing from 1 to 5 percent by weight of silicon-bonded hydroxyl radicals and from 40 to 60 parts by weight of organohydrogenpolysiloxane having the formula $(CH_3)_3SiO\{(CH_3)(H)SiO\}_{30}$ to $70Si(CH_3)_3$.

In the preparation of component (I) a homogeneous mixture is formed by thoroughly mixing the desired amounts of component (a) and component (b) and, if necessary, an acid, preferably a strong acid such as hydrochloric acid, to provide an acid number greater than zero therefor. Preferably the acid number of the homogeneous mixture, extrapolated to zero solvent content, has a value of from 0.1 to 1. Preferably component (a) is sufficiently acidic, as prepared, to provide this acidity for the homogeneous mixture.

The resulting homogeneous mixture of (a) plus (b) is immediately or subsequently heated to volatilize the organic solvent therefrom. Said heating is preferably initially done at atmospheric pressure and is then continued at reduced pressure to accelerate the removal of said solvent.

In a preferred embodiment of this invention the homogeneous mixture of (a) plus (b) is heated to about 150° C. at atmospheric pressure and is then subjected to a gradually decreasing pressure, without an increase in temperature, to remove substantially all of the organic solvent therefrom. By substantially it is meant herein that the liquid silicone resin contains less than about 5 percent, and preferably less than about 1 percent, by weight organic solvent.

Alternatively the homogeneous mixture of (a) plus (b) can be partially devolatilized at room temperature, such as by evaporation, and the partially devolatilized mixture then heated to remove substantially all of the organic solvent therefrom.

The liquid silicone resin (I) contains silicon-bonded hydroxyl radicals and/or silicon-bonded hydrogen radicals which provide chemical reactivity therefor in the compositions of this invention. The amount of silicon-bonded hydrogen radicals and/or silicon-bonded hydroxyl radicals therein depends upon the ratio of said radicals in, and the acid number of, the homogeneous mixture of (a) plus (b) that is used for its preparation.

To assure that the liquid silicone resin contains silicon-bonded hydrogen radicals, for subsequent reaction with e.g. silicon-bonded hydroxyl radicals, it is believed that the homogeneous mixture of (a) and (b) that is prepared should have at least 2, and preferably at least 3, silicon-bonded hydrogen radicals in (b) for every silicon-bonded hydroxyl radical in (a). An upper limit of 2580 for the ratio of silicon-bonded hydrogen radicals to silicon-bonded hydroxyl radicals in the homogeneous mixture occurs in a mixture of 10 parts by weight resinous copolymeric siloxane having a silanol content of 0.1 percent by weight and 90 parts by weight of the highly preferred organohydrogenpolysiloxane having a silicon-bonded hydrogen content of 1.7 percent by weight.

To assure that the liquid silicone resin contains silicon-bonded hydroxyl radicals, for subsequent reaction with e.g. silicon-bonded hydroxyl or hydrogen radicals, it is believed that the acid number of the homogeneous mixture that is heated should have a value of less than about 2.

Component (II) of the composition of this invention is any silicon-free, film-forming organic polymer. By silicon-free it is meant that the molecular structure of the organic polymer does not contain silicon atoms. By film-forming it is meant that the organic polymer can be formed into a coherent film using any of the conventional film-forming methods known in the art, such as solvent casting, extruding, melt casting, spraying, roller coating, calendering and blowing. Component (II) is alternatively designated herein as the organic polymer.

The organic polymers that are used in the present invention are well known in the organic polymer art; many are commercially available.

One class of organic polymers that is particularly useful in the present invention comprises the water-soluble organic polymers, such as poly(vinyl alcohol) and poly(acrylic acid). Water-soluble organic polymers are particularly benefitted by the present invention because films prepared from the resulting compositions of this invention have greatly increased water resistance, compared to the unmodified organic polymer films.

Another class of organic polymers that is useful in the present invention comprises the water-dispersed organic polymers that are prepared by aqueous emulsion polymerization of suitable monomers. Examples of water-dispersed organic polymers include poly(styrene-co-butadiene), poly(vinyl chloride), poly(vinyl chloride-co-ethylene), poly(methyl methacrylate) and poly(vinyl acetate). The compositions of this invention that are prepared from water-dispersed organic polymers also provide films that have improved water resistance, even though a film prepared from the organic polymer alone has appreciable water resistance.

A highly preferred organic polymer to be used in the compositions of this invention is poly(vinyl alcohol). One reason, noted above, for this preference is the greatly increased water resistance conferred upon a poly(vinyl alcohol) film by this invention. Another reason for this preference is that the emulsion stability that is provided for aqueous compositions of this invention by even small amounts of poly(vinyl alcohol) is significant and useful. In a preferred embodiment of this invention aqueous emulsion compositions having as little as one part of poly(vinyl alcohol) for every 25 parts of liquid silicone resin are provided. Advantageously, the resulting aqueous emulsion can be readily mixed with aqueous emulsions of organic polymers, such as poly(styrene-co-butadiene) latex, or additional poly(vinyl alcohol), to prepare other compositions of this invention.

Component (III) of the compositions of this invention can be any liquid which, when used in a sufficient amount, will compatibilize the normally incompatible mixture of liquid silicone resin and silicon-free, film-forming organic polymer and provide a homogeneous composition thereof.

For example, the compatibilizing liquid can be an organic solvent, or a mixture of two or more organic solvents, which is unreactive with the other components of the composition, thereby providing a homogeneous composition which is a solution or non-aqueous emulsion. Because the organic polymers that are useful in the compositions of this invention are quite varied the organic solvent that is used to prepare said compositions will vary considerably. Thus, when the organic polymer is a polar polymer, such as poly(vinyl alcohol), the organic solvent should comprise a polar solvent; such as a ketone, such as acetone or methyl isobutyl ketone or an ester, such as ethyl acetate or other polar solvent, such as dimethylsulfoxide butanol, tetrahydrofuran or dimethylformamide. When the organic polymer is a non-polar polymer, such as poly(styrene-co-butadiene), the organic solvent should comprise a non-polar solvent such as toluene, xylene, cyclohexane, hexane or mineral spirits.

Component (III) is preferably water, optionally comprising one or more surfactants, thereby providing a homogeneous composition which is an aqueous emulsion. This preference for water as the compatibilizing liquid is based on environmental, economic and efficacious considerations. That is to say, water is preferred as a compatibilizing liquid for the compositions of this invention because it it non-hazardous and non-polluting when the composition is prepared and used, as hereinafter disclosed; because it is inexpensive and because the organic polymers used herein are typically available as aqueous solutions or as aqueous emulsions.

The amount of compatibilizing liquid that is used in the compositions of this invention is merely that amount that will provide a homogeneous mixture of liquid silicone resin component and organic polymer component. Within this restriction the amount of compatibilizing liquid is not critical and can be selected to establish the solids content, i.e. concentration of non-volatile components, as desired.

When one or more surfactants are used to prepare the aqueous emulsion compositions of this invention their identity and amount can be selected by following well-known principles that are used in the emulsification of water-insoluble components, as a dispersed phase, in water, as a continuous phase.

The amounts of liquid silicone resin and silicon-free, film-forming organic polymer that are present in the compositions of this invention may vary widely, depending upon the exact nature of the components and the desired properties of the composition obtained therefrom. A range of amounts of from 1 part by weight of component (I) or (II) for every 99 parts by weight of component (II) or (I), respectively, is contemplated by this invention.

In a preferred embodiment of this invention, noted above, wherein the organic polymer is poly(vinyl alcohol) and the compatibilizing liquid is water, the ratio of the weight of liquid silicone resin to organic polymer has a value of about 25. Such a composition has its principal, but not sole, utility as an intermediate emulsion from which additional compositions of this invention can be prepared.

In a highly preferred embodiment of this invention the liquid silicone resin and the organic polymer are used in substantially equal amounts so that their weight ratio has a value of about 1 in the resulting composition of this invention.

In such "equal-weight" compositions a maximum influence of the liquid silicone resin and the organic polymer on the water resistance and the strength, respectively, of a film prepared from the composition is obtained.

Without limiting the present invention by theory it can be said that it is believed that when such "equal-weight" compositions of this invention are used to coat a substrate by a method of this invention, hereinafter delineated, a film comprising an interpenetrating network of liquid silicone resin and organic polymer is obtained whose properties are not merely fractionally additive, based on weight, of the properties of the individual components but are substantially undiminished from the properties of the neat component. That is, while the film that is formed from such a composition is only 50% liquid silicone resin and 50% organic polymer, it typically possesses the water resistance of the 100% liquid silicone resin and the strength of the 100% organic polymer.

The compositions of the present invention can further contain non-essential components which are commonly used in silicone resin compositions or in organic polymer compositions. Exemplary of non-essential components are extending and reinforcing fillers, such as silica, carbon black, ground quartz, sand, starch, calcium carbonate, clay and alumina; fibers, such as asbestos and glass fibers; pigments, such as titania and red iron oxide; thickening agents, such as bentonite clays; and stabilizing agents, such as antioxidants, buffers and biocides such as bactericides and mildewcides.

The solution compositions of the present invention can be prepared by merely mixing the components thereof in the desired amounts until a homogeneous composition is obtained.

The emulsion compositions of this invention can be prepared by well-known emulsion techniques. For example, the liquid silicone resin component can be emulsified in water using a suitable surfactant and the resulting emulsion mixed with an aqueous emulsion of silicon-free, film-forming organic polymer.

In a second aspect the present invention relates to a method for preparing a composition consisting essentially of a homogeneous mixture of (I) a liquid silicone resin prepared by (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating the homogeneous mixture of (A) to remove substantially all of said organic solvent therefrom, (II) poly(vinyl alcohol) and, optionally, one or more other silicon-free, film-forming organic polymers and (III) water, optionally containing one or more surfactants, in at least a sufficient amount to render the composition homogeneous, the weight ratio of the amount of component (I) to the amount of component (II) having a value of from 1/99 to 99/1; said method comprising (i) emulsifying the (I) liquid silicone resin with an aqueous phase comprising poly(vinyl alcohol) and (ii) mixing with the emulsion of step (i) an aqueous phase comprising any remaining portion of the (II) poly(vinyl alcohol) and any other silicon-free, film-forming organic polymer.

In the method of this invention for preparing aqueous emulsion compositions of this invention the liquid silicone resin and organic polymer components, and relative amounts thereof, used therein including preferred embodiments thereof, are as delineated above for the compositions of this invention.

In this method the liquid silicone resin is first emulsified, in step (i), with an aqueous phase which comprises poly(vinyl alcohol). Therefore, the compositions of this invention which are prepared by the method of this invention comprise poly(vinyl alcohol) as at least a portion of the silicon-free, film-forming organic polymer component thereof. The resulting emulsion is then further mixed with additional organic polymer, if desired, in step (ii).

In a preferred embodiment of the method of this invention the highly preferred liquid silicone resin, delineated above, is emulsified, in step (i), with an aqueous phase consisting essentially of water, poly(vinyl alcohol) and one or more surfactants, the weight ratio of the liquid silicone resin to the poly(vinyl alcohol) having a value of about 25. The resulting emulsion composition of this invention has sufficient stability to permit its storage and/or shipment, as desired, until subsequently being used to prepare other emulsion compositions of this invention.

For example, an aqueous emulsion composition prepared in step (i) of the preferred embodiment method of this invention can be conveniently mixed with additional aqueous poly(vinyl alcohol) or other organic polymer in aqueous emulsion form, such as a styrene-butadiene copolymer latex, to prepare aqueous emulsion compositions of this invention having a liquid silicone resin to organic polymer weight ratio of less than about 25, preferably about 1.

When the method of this invention is used to prepare aqueous emulsion compositions wherein the organic polymer is solely poly(vinyl alcohol) an alternative preferred embodiment thereof consists of omitting step (ii), the entire amount of poly(vinyl alcohol) being used in step (i).

In step (i) of the method of this invention the liquid silicone resin is preferably mixed with an aqueous solution of poly(vinyl alcohol), optionally containing one or more surfactants and the resulting mixture is then subjected to shear to reduce the size of the liquid silicone resin particles to less than 10 $\mu$m, preferably less than 1 $\mu$m. Any shear means capable of producing said particle sizes can be used to prepare the emulsion of step (i). A particularly useful shear means is a colloid mill.

In step (ii) of the method of this invention the emulsion of step (i) is mixed with an aqueous phase comprising additional organic polymer. This aqueous phase is preferably a stable solution, emulsion or dispersion of organic polymer in water which requires only simple low shear mixing with the emulsion of step (i) to prepare the aqueous emulsion compositions of this invention.

The homogeneous compositions of this invention are useful as coating compositions to provide a substrate, coated therewith, with a water-resistant film. The resulting film can serve as a protective coating or as an intermediate-force adhesive release coating.

Thus, the present invention has, as a third aspect, a method for coating a substrate.

In said third aspect the present invention relates to a method for coating a substrate, said method comprising (1) aplying to said substrate a composition consisting essentially of a homogeneous mixture of (I) a liquid silicone resin prepared by (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating the homogeneous mixture of (A) to remove substantially all of said organic solvent therefrom, (II) one or more silicon-free, film-forming organic polymer, (III) a compatibilizing liquid in at least a sufficient amount to render the composition homogeneous; the weight ratio of the amount of component (I) to the amount of component (II) having a value of from 1/99 to 99/1, and, optionally, (IV) a curing catalyst in sufficient amount to improve the curing rate of the coating and (2) evaporating the compatibilizing liquid from the applied composition.

In this method for coating a substrate with a coating composition, the coating composition used therein, including the preferred coating compositions used therein, are as delineated above for the compositions of this invention and for the method of this invention for preparing aqueous emulsion forms thereof.

The coating compositions that are used in the coating method of this invention, preferably, although not necessarily, further comprise a curing catalyst for the liquid silicone resin and/or the organic polymer.

One class of suitable curing catalysts is the silanol-condensing catalysts which are well known in the silicone coatings art. Examples of silanol-condensing catalysts include the organic acid salts of lead, tin and iron, such as iron octoate, dibutyltin dilaurate, dioctyltin dilaurate, dibutyltin diacetate, lead octoate and stannous octoate.

Another class of suitable curing catalysts is the hydrosilylation catalysts such as compounds of platinum or rhodium which are well known in the silicone coating art.

The amount of curing catalyst to be used is merely that amount that will improve the curing rate of the cured coating composition. Typically the amount of silanol-condensing curing catalyst that is used to cure the compositions of this invention ranges from 5 to 25, preferably 10 to 20, percent by weight, based on the weight of liquid silicone resin in the composition. Hydrosilation catalysts are typically used in much lower concentrations, such as 1 to 100 parts per million parts of liquid silicone resin.

The coating compositions of this invention are typically applied to a substrate as a thin film, using any suitable application method, such as spraying, dipping, brushing, offset coating or rolling. The thickness of the applied film is not critical, it being limited only by the requirement that the compatibilizing liquid component thereof be removable therefrom. Typically the coating composition is applied as a film having a thickness of from 20 to 2000, preferably from 50 to 250, micrometers.

After the coating composition has been applied the compatibilizing liquid is allowed, or forced, to volatilize, thereby providing a water-resistant solid coating on the substrate. If desired, the resulting coating can be heated to further improve the water resistance and/or the strength of the solid coating. For example, after the compatibilizing liquid has been allowed to substantially completely evaporate therefrom the coating can be heated to a temperature short of the degradation temperature of the coating and its substrate for a sufficient length of time to improve the water resistance of the coating.

The compositions of this invention can be applied to any substrate such as a metal substrate such as aluminum, iron and steel; a siliceous substrate, such as glass, concrete, brick, mortar, clay or ceramic; a polymeric substrate, such as polyamide, polyester, polyolefin or polycarbonate; and a cellulosic substrate, such as paper, cardboard or wood.

The compositions of this invention wherein the organic polymer is poly(vinyl alcohol) are particularly useful for coating a substrate because they provide a substantially transparent coating therefor, thereby allowing any desirable surface features thereon to remain visible after being coated.

The following examples are disclosed to further illustrate, but not to limit, the present invention. All parts and percentages are by weight unless otherwise stated.

The non-volatile content of a material, also denoted herein as solids or N.V.C., was either calculated from amounts of components used or measured by placing 1.50 grams of the material in an aluminum foil dish, 60 mm. in diameter and 15 mm. deep, and heating the sample for 1 hour at 150° C. in an air-circulating oven. The heated sample was then cooled to room temperature and reweighed to determine the weight of the non-volatile material (w). N.V.C., in percent is equal to 100 w/1.50.

The acid number of a material, also denoted herein as A.N., was determined by titrating 1.00 gram of the material to a bromcresol purple endpoint, using alcoholic KOH, and is equal to the number of mg. of KOH so used.

The viscosity of a material was measured at 25° C. with a Brookfield viscometer, Model RVF, and the value obtained was converted from centipoise to pascal-seconds (Pa·s) for this disclosure by multiplying by 0.001.

Herein, the abbreviation PSB denotes poly(styrene-co-butadiene) and the abbreviation PVA denotes poly(vinyl alcohol).

The following liquid silicone resins were used in the examples.

Liquid Silicone No. 1—Fifty parts of an organohydrogenpolysiloxane fluid having the formula $(CH_3)_3SiO\{(CH_3)(H)SiO\}_{35}Si(CH_3)_3$, N.V.C.=100%, A.N.=0.02, SiH=1.71% and a viscosity of 30 mPa·s was mixed with 71.4 parts of a 70% solids xylene solution of a resinous copolymeric siloxane, (50 parts of resinous copolymeric siloxane). The resinous copolymeric siloxane was prepared from 45 parts of sodium silicate (41.6°Be) and 20 parts of $(CH_3)_3SiCl$ according to the method of Daudt et al., U.S. Pat. No. 2,676,189, and contained $(CH_3)_3SiO_{1/2}$ siloxane units and $SiO_{4/2}$ siloxane units in a mol ratio of approximately 0.75/1.0 and had A.N.=0.80, SiOH=2.56%, SiH=0% and N.V.C.=70%. By extrapolation to 100% N.V.C. the resinous copolymeric siloxane itself had A.N.=1.14, SiH=0% and SiOH=3.66%.

The mixture of organohydrogenpolysiloxane fluid and resinous copolymeric siloxane solution was heated to a temperature of 150° C. at atmospheric pressure, after which the pressure was reduced to volatilize xylene and water. After the cessation of water-evolution the mixture was heated at a temperature of 150° C. and at a pressure of approximately 2 Torr (267 Pa) to remove substantially all of the remaining xylene. The resulting liquid silicone resin had the following properties: Viscosity=1900 mPa·s, N.V.C.=98.6%, SiH=0.73%, SiOH=1.2% and S.G.=1.1.

Liquid Silicone Resin No. 2—The preparation of Liquid Silicone Resin No. 1 was repeated on a larger scale. The resulting liquid resin had the following properties: Viscosity=895 mPa·s, N.V.C.=97.16%, SiH=0.81%, SiOH=1.05%, Specific Gravity=1.09, A.N.=0.088, $(CH_3)_3SiO_{1/2}$=28.5%, $(CH_3)_2SiO_{2/2}$=0.3%, $(CH_3)(H)SiO_{2/2}$=51.3% and $SiO_{4/2}$=19.9% (by difference).

EXAMPLE 1

Fifty parts of Liquid Silicone Resin No. 1 was mixed with 29.5 parts of an aqueous phase consisting of 27 parts of water, 0.5 parts of sodium alkylarylpolyether sulfonate (Triton ®X-200; Rohm and Haas Co., Inc., Philadelphia, PA), 1.33 parts of PVA having approximately 12% unhydrolyzed vinyl acetate groups and a viscosity, at 4% solids in water, of 22 mPa·s and 0.67 parts of PVA having approximately 12% unhydrolyzed vinylacetate groups and a viscosity, at 4% solids in water, of 5 mPa·s. The resulting mixture was passed once through a colloid mill set at 12 mils and the resulting emulsion was stirred into 20.5 parts of water. The final product had a calculated solids content of 52% and a calculated liquid silicone resin/PVA ratio of 25, based on amounts used.

The final product was catalyzed with 10 parts of a silanol-condensing catalyst consisting of a 50% solids aqueous emulsion of dioctyltin dilaurate, coated onto a glass surface, evaporated to dryness and heated at 150° C. for 5 minutes. The resulting cured film was brittle and was unaffected when 4 drops of water were placed thereon and allowed to remain for 1 hour.

As a control, 10 parts of a liquid silicone resin, prepared as Liquid Silicone Resin No. 1 was prepared, but having a viscosity of 1.35 Pa·s and a N.V.C.=96.97%, was mixed with 2 parts of heptane and 0.5 parts of dioctyltin dilaurate and the mixture was coated onto a glass surface and heated at 100° C. for 1 hour. A very brittle film was obtained which was unaffected by water when tested as noted above.

EXAMPLE 2

A composition of this invention was prepared by mixing 50 parts of the emulsion composition of Example 1 with 50 parts of a 50% solids aqueous emulsion of styrene-butadiene copolymer (Dow ®Latex 620; The Dow Chemical Company, Midland, MI) having a pH of 6.0±0.5 and a particle size of from 160 to 190 nm. The resulting stable mixture of emulsions had a calculated liquid silicone resin/organic polymer (PVA+PSB) ratio of 0.96 and a calculated solids content of 51%.

The above mixture of emulsions was catalyzed with 5 parts of a silanol-condensing catalyst consisting of a 50% solids aqueous emulsion of dioctyltin dilaurate, coated onto a glass surface, evaporated to dryness and heated at 150° C. for 5 minutes. The resulting cured film was tough, non-tacky, non-wetted by water and unaffected when tested for water resistance as described in Example 1.

When the PSB emulsion alone was coated onto a glass surface, evaporated to dryness and heated at 150° C. for 5 minutes a tough, slightly tacky film was obtained which was wetted by water and became soft when tested for water resistance as noted above.

This composition of this invention had the strength of the PSB film and the water resistance of the liquid silicone resin control film of Example 1.

Another portion of the above-described mixture of emulsions was catalyzed with 12.5 parts of a silanol-condensing catalyst comprising a 20% solids aqueous emulsion of dibutyltin dilaurate and the catalyzed mixture was diluted with 100 parts of water. The resulting product was coated with a No. 3 Mayer Rod unto uncoated wallpaper (Styltex Division; National Gypsum Co.; Hatfield, MA). and heated at 150° C. for 45 seconds. The thus-coated wallpaper had a glossy surface which was unaffected when soiled with motor oil or water for 2 hours. The uncoated wallpaper was stained by the motor oil and wrinkled by the water when identically soiled.

EXAMPLE 3

A composition of this invention was prepared by mixing 50 parts of the emulsion composition of Example 1 with 60 parts of water, acidified with 0.1 part of acetic acid, and 166.5 parts of a 14.47% solids aqueous solution of PVA and stirring and heating the mixture at 85° C. for 4 hours. The PVA that was used was the 1.33/0.67 mixture that was used in Example 1.

The resulting stable emulsion, having a calculated liquid silicone resin/PVA ratio of 1.0 and a calculated solids content of 18.76% was catalyzed with 10 parts of a silanol-condensing catalyst consisting of a 50% solids aqueous emulsion of dioctyltin dilaurate, coated onto a glass surface, evaporated to dryness and heated at 150° C. for 5 minutes. The resulting cured film was very tough and swelled only slightly when tested for water resistance as described in Example 1.

When the PVA solution alone was coated onto a glass surface and cured at room temperature for 24 hours a tough film was obtained which dissolved when tested for water resistance as described in Example 1.

When the PVA solution was catalyzed with 5%, based on solids, of dioctyltin dilaurate, coated onto a glass surface and heated at 100° C. for 1 hour a tough, clear film was obtained which dissolved when tested for water resistance as in Example 1.

This composition of this invention had the strength of the PVA film and the water resistance of the liquid silicone resin control film of Example 1.

EXAMPLE 4

The preparation described by Example 1 was repeated except the Liquid Silicone Resin No. 1 was mixed with 22.5, instead of 29.5, parts of aqueous phase, the difference being 7 parts of water, and the very thick mixture of liquid silicone resin and aqueous phase was passed once through a colloid mill set at 15, instead of 12, mils and stirred into 27.5, instead of 20.5, parts of water. The final product had a solids content of 52%, and a liquid silicone resin/PVA ratio of 25, both values calculated from component amounts, and a measured solids content of 49.14%

EXAMPLES 5 TO 8

These examples illustrate the preparation of compositions of this invention by a mixing process and by a mixing and heating process.

In the mixing process 33.3 parts of the emulsion composition of Example 4 and 100 parts of a 14.67% solids solution of PVA were stirred together until homogeneous. The PVA that was used was the 1.33/0.67 mixture that was used in Example 4. The resulting emulsion had a calculated liquid silicone resin/PVA ratio of 1.02 and a calculated solids content of 23.3%.

In the mixing and heating process the emulsion preparation of Example 3 was repeated except the emulsion composition of Example 4 was used instead of the emulsion composition of Example 1. The resulting emulsion had a calculated solids content of 17.6%, an actual solids content of 15.8% and a calculated liquid silicone resin/PVA ratio of 0.94.

A portion of each of the two compositions descreibed above was coated, uncatalyzed, onto a glass surface, evaporated to dryness and heated at 150° C. for 35 seconds. The resulting cured films were tested for water resistance as described in Example 1. The film provided by the mixed-only composition (Example 5) dissolved whereas the film provided by the mixed and heated composition (Example 6) was insoluble.

A portion of each of the two compositions described above was mixed with a 50% solids aqueous emulsion of dioctyltin dilaurate; 2.25% with the mixed-only composition (Example 7) and 1.5% with the mixed and heated composition (Example 8). These catalyzed compositions were coated, evaporated, heated and tested identically as with the uncatalyzed compositions (Examples 5 and 6). The film provided by the mixed-only and catalyzed composition suffered partial dissolving whereas the film provided by the mixed and heated and catalyzed composition was insoluble.

As a control the 14.47% solids PVA solution was coated onto a glass surface, evaporated to dryness, heated at 150° C. for 35 seconds and tested for water resistance as noted above; it dissolved.

These examples illustrate that, with PVA, cured compositions of this invention, whether catalyzed or not, having maximum water resistance are preferably prepared from compositions prepared from a process comprising a heating step.

EXAMPLE 9

The catalyzed composition of Example 8 was used to adhere two 1"×1"×3" pieces of wood together, the composition being applied to one side of each piece of wood and the composition-bearing surfaces overlapped 1" along the short side of each 1"×3" face. After a period of 48 hours at room temperature the adhered pieces of wood could not be separated when pulled by hand.

The adhered pieces of wood were then immersed in water at room temperature for 16 hours, after which they could not be separated by hand pulling.

EXAMPLE 10

The preparation described by Example 1 was repeated except that Liquid Silicone Resin No. 2, instead of Liquid Silicone Resin No. 1, was mixed with the aqueous phase and the resulting mixture was passed once through a colloid mill set at 15, instead of 12, mils and the resulting emulsion was stirred into a mixture of 20.5 parts of water and 0.5 parts of ethylene glycol. The resulting emulsion had a viscosity of 2.76 Pa·s, N.V.C.=50.02%, SiH=0.39% and a calculated liquid silicone resin/PVA ratio=25, based on the amount of components used. This emulsion was used to prepare compositions of this invention, as described in Examples 11 to 14.

EXAMPLES 11 TO 20

These examples, summarized in Tables I to IV, illustrate the preparation and use of compositions of this invention, using PVA and either emulsified Liquid Silicone Resin No. 2, i.e. the emulsion described by Example 10, (Examples 11 to 14) or undiluted Liquid Silicone Resin No. 2 (Examples 15 to 20).

The PVA solution that was used in Examples 11 to 20 was either a 15% solids aqueous solution of a 2/1 mixture of Lenol ®22-88 and Lenol ®5-88 (Borden Co., Chemical Division; N.Y., NY) or a 25% solids aqueous solution of Gevatol ®20-30 (Monsanto Co.; St. Louis, MO).

The compositions disclosed by Examples 11 to 20 were prepared either by a mixing process (mechanical stirring for 30 minutes at room temperature) or a colloiding process (one pass through a colloid mill set at 15 mils) or a heating process (stirring and heating at 90° C. for 2 hours) or combinations thereof.

Tables I and II summarize the preparation and properties of the compositions. The listed amounts are based on 100% solids materials. A comparison of these data shows that stable emulsions of this invention are prepared when the liquid silicone resin experiences high shear, such as a colloiding step, (Examples 11 to 18) to form an emulsion.

Table III summarizes the results obtained when the compositions of Tables I and II were evaluated as a release coating for masking tape. For this evaluation the compositions were diluted with water to 5% solids, catalyzed with 5%, based on solids, of a 50% solids aqueous emulsion of dioctyltin dilaurate, coated onto S2S kraft paper with a No. 12 Mayer Rod and heated at 150° C. for 45 seconds. Masking tape (No. 232; 3M Co.) was then applied to the cured coating and aged at 70° C. for 20 hours under a pressure of 1.7 kPa (¼ p.s.i.). The tape was then removed from the coated paper (release force measured) and the removed tape was applied to a clean stainless steel panel and then removed therefrom (release force measured). The release force from stainless steel, called Subsequent Adhesion, is expressed in Table III as a percentage (S.A.,%) of the release force that the masking tape demonstrated when applied to the clean stainless steel panel without having first been applied to a release coating. Table III discloses that the compositions of Examples 11 to 20 are useful as a tape-backsize coating compositions for use in preparing rolls of masking tape.

Table IV summarizes the results obtained when the catalyzed compositions were coated onto a glass surface, evaporated to dryness, heated at 150° C. for 5 minutes and immersed in distilled water for the time indicated. These data show that the compositions of the present invention all possess improved water resitance, compared to a film of poly(vinyl alcohol).

TABLE I

| Item | Example Number | | | |
|---|---|---|---|---|
| | 11 | 12 | 13 | 14 |
| Component | | | | |
| Liquid Silicone Resin No. 2, parts | | | | |
| Undiluted | | | | |
| Emulsified | 50 | 50 | 50 | 50 |
| Poly(vinyl alcohol), parts | | | | |
| Lenol 22-88/5-88 | 50 | 50 | | |
| Gevatol 20-30 | | | 50 | 50 |
| Preparation Method | | | | |
| Mixing | x | x | x | x |
| Colloiding | | | | |
| Heating | x | | x | |
| Properties | | | | |
| N.V.C., % | 23.2 | 23.0 | 33.5 | 33.4 |
| Particle Size, nm | 175 | 132 | 148 | 132 |
| Viscosity, mPa·s | | | | |
| Initial | 1700 | 1730 | 1100 | 1350 |
| 3 weeks/25° C. | 2080 | 1850 | 1170 | 1150 |
| SiH, % | 0.086 | 0.087 | 0.130 | 0.131 |

TABLE II

| Item | Example Number | | | | | |
|---|---|---|---|---|---|---|
| | 15 | 16 | 17 | 18 | 19 | 20 |
| Components, solids | | | | | | |
| Liquid Silicone Resin No. 2, parts | | | | | | |
| Undiluted | 50 | 50 | 50 | 50 | 50 | 50 |
| Emulsified | | | | | | |
| Poly(vinyl alcohol), parts | | | | | | |
| Lemol 22-88/5-88 | 50 | | 50 | | 50 | 50 |
| Gevatol 20-30 | | 50 | | 50 | | |
| Preparation Method | | | | | | |
| Mixing | | | | | x | x |
| Colloiding | x | x | x | x | | |
| Heating | | | x | x | x | |
| Properties | | | | | | |
| N.V.C., % | 24.1 | 38.0 | 24.1 | 40.0 | 25.4 | 25.2 |
| Particle Size, nm | 175 | 250 | 148 | 240 | 660 | — |
| Viscosity, mPa·s | | | | | | |
| Initial | 2490 | 2200 | 2490 | 3070 | 3000 | 2830 |
| 3 weeks/25° C. | 2640 | 2690 | 2700 | 3600 | (1) | (1) |
| SiH, % | 0.085 | 0.148 | 0.077 | 0.154 | 0.079 | 0.088 |

(1) Composition separated after eleven days.

TABLE III

| | Masking Tape | |
|---|---|---|
| Example Number | Release, N/m | S.A., % |
| 11 | 174 | 90.3 |
| 12 | 174 | 103.8 |
| 13 | 174 | 88 |
| 14 | 183 | 76.7 |
| 15 | 222 | 81.3 |
| 16 | 216 | 76.7 |
| 17 | 212 | 90.3 |
| 18 | 203 | 76.7 |
| 19 | 145 | 97.1 |
| 20 | 154 | 103.8 |

TABLE IV

| | Water Resistance (1) After | | | |
|---|---|---|---|---|
| Example Number | 2 Hours | 16 Hours | 72 Hours | 168 Hours |
| 11 | 2 | 8 | 10 | 10 |
| 12 | 1 | 8 | 10 | 10 |
| 13 | 1 | 5 | 7 | 7 |
| 14 | 1 | 3 | 4 | 4 |
| 15 | 1 | 3 | 4 | 7 |
| 16 | 3 | 5 | 8 | 8 |
| 17 | 2 | 8 | 9 | 9 |
| 18 | 2 | 3 | 3 | 3 |
| 19 | 1 | 8 | 10 | 10 |

TABLE IV-continued

| Example Number | Water Resistance (1) After | | | |
|---|---|---|---|---|
| | 2 Hours | 16 Hours | 72 Hours | 168 Hours |
| 20 | 1 | 8 | 10 | 10 |
| PVA | 10 | — | — | — |

(1) See Table V for key.

TABLE V

| Water Resistance Rating | Rating Meaning |
|---|---|
| 1 | No change in film |
| 2 | Film became opaque |
| 3 | Film softened |
| 4 | Slight wrinkling |
| 5 | Wrinkling |
| 6 | Considerable wrinkling |
| 7 | Film lifted |
| 8 | Partially dissolved |
| 9 | Almost completely dissolved |
| 10 | Film completely dissolved |

EXAMPLE 21

The preparation described in Example 10 was repeated except that aqueous phase with which the liquid silicone resin was mixed and colloided contained 20, instead of 27, parts of water and the dilution phase into which the colloided mixture was stirred consisted of 27, instead of 20.5, parts of water and 0.5 parts of ethylene glycol. The resulting emulsion had a calculated liquid silicone resin/PVA ratio of 25.

EXAMPLES 22 TO 26

These examples, summarized in Table VI, illustrate further the types of film-forming organic polymers that can be used in the present invention.

The compositions described in these examples were prepared by mixing, at room temperature, 100 parts of the emulsion composition of Example 21 with a sufficient amount of the aqueous emulsion of organic polymer to provide a liquid silicone resin/organic polymer ratio of 1 in the final composition.

The following organic polymer emulsions were used in these examples:

Eastman®MPS 7762—A 30% solids, water-dispersible polyester sizing dispersion having a pH of 5 to 6. Eastman Chemical Products, Inc., Kingsport, TN.

Gen-Tac®—A 41% solids, vinyl pyridine—based latex adhesive. General Tire; Chemical/Plastics Division; Akron, OH.

Airflex®4814—A 47% solids, carboxyl-functional ethylene-vinyl chloride emulsion having a pH of 8.5 to 11. Air Products and Chemicals, Inc.; Allentown, PA.

Airflex®4514—A 50% solids, amide-functional ethylene-vinyl chloride emulsion having a pH of 7 to 9. Same source as for Airflex 4814.

UAP 060—A 40% solids urethane acrylic lacquer coating colloid having a pH of 7.0. Polyken, Inc.; Middletown, CT.

The resulting five compositions of this invention were coated onto a glass surface, evaporated to dryness, heated at 100° C. for 1 hour and immersed in distilled water for the time indicated. As controls, the composition of Example 21 and the above-listed organic polymers were identically coated, dried, heated and immersed.

Examination of Table VI shows that each film prepared from a composition of this invention has improved water resistance, compared to the unmodified organic polymer film.

TABLE VI

| Reference Number | Film Appearance | Water Resistance (1) After | | |
|---|---|---|---|---|
| | | 1 Hour | 1 Day | 14 Days |
| Example 22 | White, tough | 4 | 6,7 | 9 |
| Eastman MPS | Clear, tough | 7 | 9,10 | 10 |
| Example 23 | Dry, yellow | 1 | 1 | 1 |
| Gen-Tac | Tacky, yellow | 3,7 | 7 | 3,6,8 |
| Example 24 | White, oily | 2 | 2,7 | 3,7 |
| Airflex 4814 | Yellow | 1,7 | 7 | 6.8 |
| Example 25 | White, dry | 2 | 2,7 | 2,7 |
| Airflex 4514 | Yellow | 1,7 | 2,7 | 10 |
| Example 26 | Tough, cracked | 1 | 1 | 1 |
| UAP 060 | Brittle | 1,7 | 8 | 9 |
| Example 21 | Opaque, cheesy | 1 | 1 | 1 |

(1) See Table V for key.

EXAMPLE 27

Fifty parts of the emulsion composition of Example 10 and 50 parts of Dow®Latex 620 were mixed and acidified with 1 drop of glacial acetic acid. The acidified mixture was heated at 90° C. for 3 hours and cooled to room temperature.

Twenty parts of the resulting composition of this invention was mixed with 40 parts of $CaCO_3$. Another twenty parts of the composition was mixed with 70 parts of $CaCO_3$. For comparison, twenty parts of Dow®Latex 620 was mixed with 40 parts of $CaCO_3$. The three $CaCO_3$-containing compositions provided tough films when applied to aluminum, glass, Fiberglass® and paper; however, only the $CaCO_3$-containing compositions of this invention exhibited excellent bonding to the listed substrates.

On standing for 30 days at room temperature both of the $CaCO_3$-containing compositions of this invention remained homogeneous while the comparison composition deposited a hard precipitate. This example illustrates the unusual filler-loading capacity of the compositions of this invention. The compositions of this example are particularly useful as a carpet backing adhesive in the manufacture of needle-tufted carpet.

EXAMPLE 28

One hundred parts of the acidified and heated composition of this invention that was prepared in Example 27 was diluted with 400 parts of water and catalyzed with 5 parts of a 50% solids aqueous emulsion of dioctyltin dilaurate. The resulting emulsion was applied to leather and the thus-treated leather was heated at 105° C. for 60 seconds. When tested for water resistance as described in Example 1 the treated leather experienced no water spotting.

That which is claimed is:
1. A composition consisting essentially of a homogeneous mixture of
  (I) a liquid silicone resin prepared by
    (A) forming a homogeneous mixture having an acid number greater than zero and consisting essentially of
      (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating the homogeneous mixture of (A) to remove substantially all of said organic solvent therefrom, (II) one or more silicon-free, film-forming organic polymers, and (III) a compatibilizing liquid in at least a sufficient amount to render the composition homogeneous; the weight ratio of the amount of component (I) to the amount of component (II) having a value of from 1/99 to 99/1.

2. A composition according to claim 1 wherein the (I) liquid silicone resin is prepared from (a) an organic solvent solution of a resinous copolymeric siloxane consisting essentially of $(CH_3)_3SiO_{1/2}$ siloxane units and $SiO_{4/2}$ siloxane units and (b) a liquid organohydrogenpolysiloxane having the formula $(CH_3)_3SiO\{(CH_3)(H)SiO\}_bSi(CH_3)_3$ wherein b has an average value of from 30 to 70, the weight ratio of resinous copolymeric siloxane to liquid organohydrogenpolysiloxane having a value of from 40/60 to 60/40.

3. A composition according to claim 2 wherein the (III) compatibilizing liquid is water, optionally comprising one or more surfactants.

4. A composition according to claim 3 wherein the (II) silicon-free, film-forming organic polymer is poly(vinyl alcohol).

5. A composition according to claim 4 wherein the weight ratio of (I) liquid silicone resin to (II) poly(vinyl alcohol) has a value of about 1.

6. A composition according to claim 4 wherein the weight ratio of (I) liquid silicone resin to (II) poly(vinyl alcohol) has a value of about 25.

7. A composition according to claim 3 wherein the (II) silicon-free, film-forming organic polymer comprises emulsion-polymerized poly(styrene-co-butadiene).

8. A composition according to claim 7 wherein the weight ratio of (I) liquid silicone resin to (II) silicon-free, film-forming organic polymer has a value of about 1.

9. A method for preparing a composition consisting essentially of a homogeneous mixture of (I) a liquid silicone resin prepared by (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating the homogeneous mixture of (A) to remove substantially all of said organic solvent therefrom, (II) poly(vinyl alcohol) and, optionally, one or more other silicon-free, film-forming organic polymers and (III) water, optionally containing one or more surfactants, in at least a sufficient amount to render the composition homogeneous, the weight ratio of the amount of component (I) to the amount of component (II) having a value of from 1/99 to 99/1; said method comprising (i) emulsifying the (I) liquid silicone resin with an aqueous phase comprising poly(vinyl alcohol) and (ii) mixing with the emulsion of step (i) an aqueous phase comprising any remaining portion of the (II) poly(vinyl alcohol) and any other silicon-free, film-forming organic polymer.

10. A method according to claim 9 wherein the weight ratio of (I) liquid silicone resin to (II) poly(vinyl alcohol) in the emulsion of step (i) has a value of about 25.

11. A method according to claim 10 wherein the emulsion of step (i) is mixed, in step (ii), with an aqueous solution of (II) poly(vinyl alcohol); the weight ratio of (I) liquid silicone resin to (II) poly(vinyl alcohol) in the resulting mixture having a value of about 1.

12. A method according to claim 10 wherein the emulsion of step (i) is mixed, in step (ii), with (II) a poly(styrene-co-butadiene) latex; the weight ratio of (I) liquid silicone resin to (II) the total of poly(vinyl alcohol) plus poly(styrene-co-butadiene) having a value of about 1.

13. A method according to claim 9 wherein the weight ratio of (I) liquid silicone resin to (II) poly(vinyl alcohol) in the emulsion of step (i) has a value of about 1 and step (ii) is omitted.

14. A method for coating a substrate, said method comprising (1) applying to said substrate a composition consisting essentially of (I) a liquid silicone resin prepared by (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating the homogeneous mixture of (A) to remove substantially all of said organic solvent therefrom, (II) one or more silicon-free, film-forming organic polymers, (III) a compatibilizing liquid in at least a sufficient amount to render the composition homogeneous; the weight ratio of the amount of component (I) to the amount of component (II) having a value of from 1/99 to 99/1, and optionally, (IV) a curing catalyst in sufficient amount to improve the curing rate of the coating, and (2) evaporating the compatibilizing liquid from the applied composition.

15. A method according to claim 14 wherein the liquid coating composition is an aqueous emulsion.

16. A method according to claim 15 wherein the evaporating is accomplished at an elevated temperature, said elevated temperature being sufficient to improve the water resistance and/or the strength of the coating, compared to the coating produced by room-temperature evaporation of the aqueous compatibilizing liquid.

17. A method according to claim 16 wherein the (II) silicon-free, film-forming organic polymer comprises poly(styrene-co-butadiene) and the weight ratio of (I) liquid silicone resin to (II) silicon-free, film-forming organic polymer is about 1.

18. A method according to claim 17 wherein the substrate is paper.

19. A method according to claim 16 wherein the (II) silicon-free, film-forming organic polymer is poly(vinyl alcohol) and the weight ratio of (I) liquid silicone resin to (II) poly(vinyl alcohol) is about 1.

20. A method according to claim 19 wherein the substrate is paper.

* * * * *

UNITED STATES PATENT AND TRADEMARK OFFICE
CERTIFICATE OF CORRECTION

PATENT NO. : 4,423,095
DATED : December 27, 1983
INVENTOR(S) : John D. Blizzard

It is certified that error appears in the above-identified patent and that said Letters Patent is hereby corrected as shown below:

In column 2, line 19, "consisting" should read -- containing --.

Signed and Sealed this

Eighth Day of January 1985

[SEAL]

Attest:

*Attesting Officer*

GERALD J. MOSSINGHOFF

*Commissioner of Patents and Trademarks*